(12) United States Patent
Chou et al.

(10) Patent No.: US 7,897,685 B2
(45) Date of Patent: Mar. 1, 2011

(54) THERMOPLASTIC ELASTOMER COMPOSITIONS

(75) Inventors: Richard T. Chou, Hockessin, DE (US); Kye Hyun Kim, Seoul (KR); Yun-Tong Ou, Taichung (TW)

(73) Assignee: E. I. du Pont de Nemours and Company, Wilmington, DE (US)

( * ) Notice: Subject to any disclaimer, the term of this patent is extended or adjusted under 35 U.S.C. 154(b) by 408 days.

(21) Appl. No.: 11/294,970

(22) Filed: Dec. 6, 2005

(65) Prior Publication Data

US 2006/0293452 A1  Dec. 28, 2006

Related U.S. Application Data

(60) Provisional application No. 60/633,757, filed on Dec. 7, 2004.

(51) Int. Cl.
*C08L 51/00* (2006.01)
*C08L 71/00* (2006.01)
*C08L 77/00* (2006.01)
*C09J 175/04* (2006.01)

(52) U.S. Cl. .......................................... 525/66

(58) Field of Classification Search .................. 525/191, 525/71, 66, 74
See application file for complete search history.

(56) References Cited

U.S. PATENT DOCUMENTS

| | | |
|---|---|---|
| 3,264,272 A | 8/1966 | Rees |
| 3,350,372 A | 10/1967 | Anspon et al. |
| 3,651,014 A | 3/1972 | Witsiepe |
| 3,756,996 A | 9/1973 | Pugh et al. |
| 3,763,109 A | 10/1973 | Witsiepe |
| 3,766,146 A | 10/1973 | Witsiepe |
| 4,174,357 A | 11/1979 | Chapman |
| 4,230,838 A | 10/1980 | Foy et al. |
| 4,248,990 A | 2/1981 | Pieski et al. |
| 4,331,786 A | 5/1982 | Foy et al. |
| 4,332,920 A | 6/1982 | Foy et al. |
| 4,351,931 A | 9/1982 | Armitage |
| 4,778,842 A * | 10/1988 | Taniguchi et al. ............ 524/504 |
| 4,853,061 A * | 8/1989 | Leung ........................ 156/216 |
| 5,028,674 A | 7/1991 | Hatch et al. |
| 5,106,916 A | 4/1992 | Mitchell |
| 5,234,986 A * | 8/1993 | McBride ..................... 524/505 |
| 5,532,066 A | 7/1996 | Latiolais et al. |
| 6,077,906 A | 6/2000 | Thiruvengada et al. |
| 6,242,063 B1 * | 6/2001 | Ferrera et al. ............... 428/35.2 |
| 6,545,091 B1 | 4/2003 | Lee et al. |
| 6,562,477 B1 | 5/2003 | Leon et al. |
| 6,884,485 B2 | 4/2005 | Baumann et al. |
| 2002/0077606 A1 | 6/2002 | Trotta |
| 2005/0014842 A1 | 1/2005 | Baumann et al. |

FOREIGN PATENT DOCUMENTS

| | | | |
|---|---|---|---|
| CA | 2457748 | * | 5/2003 |
| EP | 0 266 994 A2 | | 5/1988 |
| EP | 0 345 854 A2 | | 12/1989 |
| EP | 0 408 470 A1 | | 1/1991 |
| EP | 0 459 862 A1 | | 12/1991 |
| EP | 1 329 481 A2 | | 7/2003 |
| EP | 1 518 901 A2 | | 3/2005 |
| JP | 58/103558 | | 6/1983 |
| KR | 2003 058424 A | | 7/2003 |
| WO | WO 99/25742 | | 5/1999 |

OTHER PUBLICATIONS

Chou et al., "High Flexibility EMA Made From High Pressure Tubular Process", Annual Technical Conference, Society of Plastics Engineers (2002), 60th (vol. 2), pp. 1832-1836.
PCT International Search Report for International Application No. PCT/US2005/044602 dated Jul. 14, 2006.

* cited by examiner

*Primary Examiner* — Jeffrey C Mullis
(74) *Attorney, Agent, or Firm* — Maria M. Kourtakis; Kelly Law Registry

(57) ABSTRACT

Polymer compositions having thermoplastic and elastomeric features are provided. These polymer compositions, which are also characterized by superior compatibility with water-based and solvent-based adhesives, comprise at least one thermoplastic elastomer and at least one maleated ethylene copolymer. The compositions of the invention are useful in articles of manufacture that require flexibility and are fabricated with adhesives, including sporting goods, and particularly athletic shoes.

29 Claims, No Drawings

THERMOPLASTIC ELASTOMER COMPOSITIONS

CROSS REFERENCE TO RELATED APPLICATION

The present application claims priority under 35 U.S.C. §120 to U.S. Provisional Appln. No. 60/633,757, filed Dec. 7, 2004, which is incorporated herein by reference in its entirety.

BACKGROUND OF THE INVENTION

1. Field of the Invention

The present invention relates to the field of polymer compositions, and in particular to compositions comprising at least one thermoplastic elastomer. The polymer compositions of the invention are useful in articles of manufacture that require flexibility and are fabricated with adhesives, including sporting goods, and particularly athletic shoes.

2. Description of the Related Art

Several patents and publications are cited in this description in order to more fully describe the state of the art to which this invention pertains. The entire disclosure of each of these patents and publications is incorporated by reference herein.

Thermoplastic elastomers are high value materials that offer desirable properties together with the convenience of melt processability and the environmental advantages of recycling. Several genera of thermoplastic elastomers are known. Two that have achieved commercial significance are the block copolymers of ethers and amides (copolyetheramides) and those of ethers and esters (copolyetheresters).

Copolyetheramides and copolyetheresters offer unique dynamic mechanical properties, such as maintaining constant flexibility over a wide temperature range, and maintaining toughness at very low temperatures. Thus, despite their high cost, these materials have found a particular utility in the sporting goods and athletic shoe industries. For example, copolyetheramides are widely used in shoe parts such as sole plates, shanks, and various other components in which low hysteresis and substantially ideal elastic recovery properties are required.

In compound structures that comprise parts made of thermoplastic elastomers, the thermoplastic elastomers are typically fastened to the other components of the structure with adhesives. In the fabrication of athletic shoes, for example, solvent-based adhesives are usually applied to the parts comprising copolyetheramides. The adhesion is generally adequate; however, adhesion failure is not uncommon, especially since constant bending and flexing is often required of the parts made from thermoplastic elastomers. Adhesion failure is a major product defect. Therefore, improving the adhesion of thermoplastic elastomeric parts is a significant goal.

More importantly, driven by environmental concerns, industry is gradually phasing out solvent-based adhesives and substituting water-based adhesives or hot-melt adhesives. In this regime, adhering copolyetheramides and copolyetheresters to other substrates becomes even more difficult. In fact, copolyetheramides simply fail to attain adequate adhesion with water-based adhesives.

In light of the foregoing, it will be appreciated that an ongoing need exists to maintain the desirable dynamic mechanical properties of thermoplastic elastomers while improving their economic efficiency and their adhesion, particularly with water based adhesives

SUMMARY OF THE INVENTION

It has now surprisingly been found that blends of maleated ethylene copolymers with thermoplastic elastomers exhibit superior bonding strength without compromising key mechanical properties.

Accordingly, in a first aspect, the present invention provides a polymer composition comprising at least one thermoplastic elastomer and at least one maleated ethylene copolymer.

In another aspect, the present invention provides an article comprising the polymer composition of the invention.

In yet another aspect, the present invention provides a compound article, in which an article comprising the polymer composition of the invention is attached to a second article by means of an adhesive.

DETAILED DESCRIPTION OF THE INVENTION

The following definitions apply to the terms as used throughout this specification, unless otherwise limited in specific instances.

The term "maleated ethylene copolymer", as used herein, refers to copolymers that contain ethylene and residues possessing maleic acid functionality, that is, an alpha, beta-dicarboxylic acid moiety. The alpha, beta-dicarboxylic acid moiety may be in anhydride form; alternatively, it may be unneutralized, neutralized, or partially neutralized by at least one suitable cation.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such.

In one embodiment, the present invention provides a polymer composition comprising at least one thermoplastic elastomer and at least one maleated ethylene copolymer.

Suitable thermoplastic elastomers for use in the present invention include, without limitation, copolyetheramides, copolyetheresters, and the like. Copolyetheramides are well known in the art, as described in U.S. Pat. No. 4,230,838, 4,332,920 and 4,331,786, for example. These polymers are comprised of a linear and regular chain of rigid polyamide segments and flexible polyether segments, as represented by the general formula

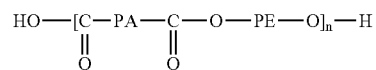

wherein "PA" represents a linear saturated aliphatic polyamide sequence formed from a lactam or amino acid having a hydrocarbon chain containing 4 to 14 carbon atoms, or from an aliphatic $C_6$ to $C_9$ diamine, in the presence of a chain-limiting aliphatic carboxylic diacid having 4 to 20 carbon atoms. The polyamide has an average molecular weight between 300 and 15,000 Daltons. In this formula, "PE" represents a polyoxyalkylene sequence formed from linear or branched aliphatic polyoxyalkylene glycols, mixtures thereof or copolyethers derived therefrom. The polyoxyalkylene glycols preferably have a molecular weight of less than or equal to 6000 Daltons. The number of repeat units, "n", is preferably sufficient so that the polyetheramide copolymer has an intrinsic viscosity of from about 0.8 to about 2.05. The preparation of these polyetheramides comprises the step of reacting a dicarboxylic polyamide, the COOH groups of which are located at the chain ends, with a polyoxyalkylene glycol that is hydroxylated at its chain ends, in the presence of a catalyst such as a tetra-alkyl ortho-titanate having the general formula Ti(OR)$_4$, wherein "R" represents a linear branched aliphatic hydrocarbon radical having from 1 to 24 carbon atoms. The softness of the polyetheramide block copolymer generally increases as the relative amount of polyether units is increased. For purposes of the present invention, the molar ether:amide ratio can vary from 90:10 to 10:90, preferably 80:20 to 60:40; and the shore D hardness is less than about 70, preferably less than about 60.

The copolyetheresters are discussed in detail in patents such as U.S. Pat. Nos. 3,651,014; 3,766,146; and 3,763,109. They are comprised of a multiplicity of recurring long chain units and short chain units joined head-to-tail through ester linkages, the long chain units being represented by the formula

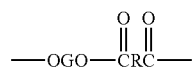

and the short chain units being represented by the formula

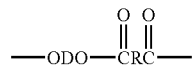

where "G" represents a divalent radical remaining after the removal of terminal hydroxyl groups from a poly (alkylene oxide) glycol having a molecular weight of about 400 to about 6000 Daltons and a carbon to oxygen ratio of about 2.0-4.3. "R" represents a divalent radical remaining after removal of hydroxyl groups from a dicarboxylic acid having a molecular weight less than about 300 Daltons. "D" represents a divalent radical remaining after removal of hydroxyl groups from a diol having a molecular weight less than about 250 Daltons. The amount of short chain ester units is preferably from about 15 to about 95 percent by weight of the copolyetherester. The preferred copolyetherester polymers are those in which the polyether segment is obtained by polymerization of tetrahydrofuran and the polyester segment is obtained by polymerization of tetramethylene glycol and phthalic acid. The softness of the copolyetherester block copolymers also generally increases as the relative amount of polyether units is increased. For purposes of the present invention, the molar ether:ester ratio can vary from 90:10 to 10:90, preferably 80:20 to 60:40; and the shore D hardness is less than about 70, preferably less than about 60.

Certain thermoplastic elastomers that are suitable for use in the present invention are available commercially. These include PEBAX™ copolyetheramides, available from the Arkema Group of Paris, France (hereinafter "Arkema"), and Hytrel® copolyetheresters, available from E.I. du Pont de Nemours & Co. of Wilmington, Del. (hereinafter "DuPont").

The polymer composition of the invention also comprises at least one maleated ethylene copolymer. Maleic acid functionality may be included in the maleated ethylene copolymer(s) by grafting, by direct copolymerization, or by a combination of grafting and direct copolymerization.

With respect to directly copolymerized maleated ethylene copolymers, dipolymers and copolymers of four or more comonomers are suitable for use in the present invention. Terpolymers are preferred, however. Terpolymers of ethylene, vinyl acetate or an acrylic ester and an alpha, beta unsaturated dicarboxylic acid are more preferred, and terpolymers of ethylene, an acrylic ester and an alpha, beta unsaturated dicarboxylic acid are still more preferred.

Copolymers of ethylene, methyl acrylate, and maleic anhydride are examples of preferred terpolymers. The preferred terpolymers comprise from about 60 wt % to about 85 wt % of ethylene, from about 15 wt % to about 39 wt % of the acrylic ester, and from about 1 wt % to about 8 wt % of the alpha, beta unsaturated dicarboxylic acid, based on the total weight of the ethylene copolymer. More preferred terpolymers comprise from about 70 wt % to about 85 wt % of ethylene, from about 15 wt % to about 29 wt % of the acrylic ester, and from about 1 wt % to about 3 wt % of the alpha, beta unsaturated dicarboxylic acid, based on the total weight of the ethylene copolymer.

Suitable acrylic esters include, without limitation, methyl acrylate, ethyl acrylate, n-butyl acrylate and iso-butyl acrylate. Suitable alpha, beta unsaturated dicarboxylic acid monomers include, without limitation, fumaric acid, maleic acid, maleic anhydride, and the esters and half-esters of maleic anhydride, such as ethyl hydrogen maleate. Maleic acid and its esters and half-esters are preferred.

Certain directly copolymerized maleated ethylene copolymers that are suitable for use in the present invention are available commercially. Lotader™ 3200, commercially available from Arkema, is an example of a terpolymer of ethylene, butyl acrylate, and maleic anhydride.

Ethylene copolymers suitable for use as substrates onto which maleic acid functionality may be grafted include, without limitation, copolymers of ethylene and a vinyl alkanoate, preferably ethylene/vinyl acetate copolymers. Alternatively, the copolymer may be a copolymer of ethylene and an acrylate ester, for example ethylene/ethyl acrylate copolymers, ethylene/methyl acrylate copolymers and ethylene/butyl acrylate copolymers. Similarly, the copolymer may be a copolymer of ethylene and a methacrylate ester, such as ethylene/methyl methacrylate.

In addition, the grafting substrate may be a copolymer of ethylene with carbon monoxide, optionally further including one of the aforementioned monomers, such as, e.g., ethylene/carbon monoxide, ethylene/alkyl acrylate/carbon monoxide, and ethylene/vinyl acetate/carbon monoxide copolymers. In ethylene/alkyl acrylate/carbon monoxide copolymers, the preferred alkyl groups are straight chain or branched groups including one to four carbon atoms. Ethylene/butyl acrylate/carbon monoxide (E/nBA/CO) copolymers are particularly preferred.

The more preferred grafting substrate copolymers are those of high polarity, such as ethylene/alkyl acrylate/carbon monoxide, ethylene/vinyl acetate/carbon monoxide, ethylene/vinyl acetate (EVA), and ethylene/acrylate copolymers. Still more preferably, the vinyl acetate content of the EVA copolymer and the ethylene/vinyl acetate/carbon monoxide copolymer is greater than about 15 wt % and less than about 40 wt %, based on the total weight of the respective copolymer. Likewise, the alkyl acrylate content of the ethylene/alkyl acrylate or ethylene/alkyl acrylate/carbon monoxide copolymer is also preferably greater than about 15 wt % and less than about 40 wt %, based on the total weight of the respective copolymer. In the case of ethylene/alkyl acrylate/carbon monoxide copolymer, the carbon monoxide content is preferably in the range of about 5 to about 15 wt %.

Any known grafting process may be used to produce a maleated ethylene copolymer for use in the present invention. Examples of suitable maleation processes are set forth in U.S. Pat. No. 5,106,916. Additional information pertaining to the preparation and use of maleated polyethylenes is available in U.S. Pat. No. 6,545,091.

Briefly, however, the preferred monomers to be grafted onto polymers are: maleic anhydride, maleic acid, half-esters of maleic anhydride, such as ethyl hydrogen maleate, itaconic acid and fumaric acid. More preferred monomers include maleic anhydride and its half-esters. The grafting can be carried out in solution, in dispersion, in a fluidized bed, or in the melt without a solvent, as described in European Patent Application No. 0,266,994. Melt grafting can be done in a heated extruder, a Brabender™ or a Banbury™ mixer or other internal mixers or kneading machines, roll mills and the like. The grafting may be carried out in the presence or absence of a radical initiator such as a suitable organic peroxide. The graft polymers may be recovered by any method that separates or utilizes the graft polymer. Thus, the graft polymer can be recovered in the form of precipitated fluff, pellets, powders and the like.

The preferred level of grafted monomer in the maleated ethylene copolymer is in the range of about 0.3 to 3.0 wt %, more preferably 0.5 to 1.5 wt %, based on the weight of the copolymer.

Ethylene copolymers can be produced by processes well known in the polymer art using either autoclave or tubular reactors. The copolymerization can be run as a continuous process in an autoclave as disclosed in U.S. Pat. No. 3,264,272; 4,351,931; 4,248,990; and 5,028,674 and International Patent Application WO99/25742. Tubular reactor-produced ethylene copolymer can be distinguished from the more conventional autoclave produced ethylene copolymer as generally known in the art. Tubular reactor-produced ethylene copolymer are well known to one skilled in the art such as disclosed in U.S. Pat. Nos. 3,350,372; 3,756,996; and 5,532,066; the description of which is omitted herein for the interest of brevity. See also, "High flexibility EMA made from high pressure tubular process," Annual Technical Conference—Society of Plastics Engineers (2002), $60^{th}$ (Vol. 2), 1832-1836.

The compositions according to the invention preferably contain from about 60 to about 95 wt % of the thermoplastic elastomer(s), based on the total weight of the polymer composition, more preferably 70 to 90 wt %, and still more preferably 75 to 85 wt %.

It follows arithmetically that the compositions according to the invention preferably contain from about 5 to about 40 wt % of the maleated ethylene copolymer(s), based on the total weight of the polymer composition, more preferably 10 to 30 wt %, and still more preferably 15 to 25 wt %.

The polymer compositions of the invention may also include such additives as are conventional in polymer compositions, for example, antioxidants, UV stabilizers, flame retardants, plasticizers, pigments, fillers, reinforcements, processing aids, and the like. Suitable levels of these additives and methods of incorporating these additives into polymer compositions are known to those of skill in the art. See, e.g., the *Modern Plastics Encyclopedia*, McGraw Hill, (New York, 1994).

The polymer compositions of the invention may be made by blending the individual components by any suitable means known in the art. For example, the individual materials can be mixed with each other in molten form, such as by melt blending in an extruder. Alternatively, the individual materials can be blended with each other in a high shear mixing device, such as a two-roll mill or a Banbury mixer.

In another aspect, the present invention provides an article comprising the polymer composition of the invention. Preferred articles of the invention include footwear components such as sole plates and shanks. Such articles may be made according to methods that are well known in the art. For example, the polymer composition of this invention can be formed by normal thermoplastic forming methods such as extrusion, blown film extrusion, injection molding, rotational molding, thermoforming, or any other technique that will produce the desired shape. Injection molding is a preferred method of forming articles according to the invention.

In yet another aspect, the present invention provides a compound article, in which an article comprising the polymer composition of the invention is attached to a second article by means of an adhesive. The adhesive may be a water-based adhesive, a solvent-based adhesive, or a hot-melt adhesive. Preferred adhesives are available commercially from the National Starch Company through Dongsung NSC of Kyunggi, Republic of Korea (hereinafter "Dongsung NSC"). Preferably, the adhesive includes a polyurethane. The second article may be any article that is also compatible with the adhesive. Preferably, the second article comprises a rubber.

The compound article according to the invention may be made by any suitable means known in the art. For example, the article comprising the composition of the invention and the second article may both be placed in contact with an adhesive. Alternatively, the article comprising the composition of the invention may be pre-formed and at least partially coated with an adhesive when the second article is formed by molding it directly in contact with the adhesive. Likewise, the second article may be pre-formed and at least partially coated with an adhesive when the article comprising the composition of the invention is formed by molding it directly in contact with the adhesive.

Preferably, the polymer compositions of the present invention are used to make articles for use in sporting goods, and particularly, components of athletic shoes. It is to be understood, however, that the articles and methods described herein are considered to be within the scope of the invention, whether they are used in sporting goods or in a different application. Examples of suitable articles that may be fabricated from a polymer composition of the invention include, without limitation, sole plates, shanks, and the like. Also the polymer compositions of the present invention may be used for in-line skates, ski boots and bindings, and the like, which are compound articles according to the invention.

The following examples are provided to describe the invention in further detail. These examples, which set forth a preferred mode presently contemplated for carrying out the invention, are intended to illustrate and not to limit the invention.

EXAMPLES

1. Materials

Pebax™ 7033, Pebax™ 6333 and Pebax™ 5533 were supplied by Arkema. The maleated ethylene copolymer is a maleic anhydride grafted terpolymer of E/nBA/CO (weight ratio of 60/30/10) containing about 1.0 wt % of maleic anhydride residues. The maleated ethylene-methyl acrylate copolymer (E/MA) is a maleic anhydride grafted E/MA (weight ratio of 76/24) containing about 1.0 wt % of maleic anhydride residues. The maleic anhydride grafting was conducted in a twin screw extruder in a similar process similar to that described in U.S. Pat. No. 5,106,916.

The test specimen of Comparative Example 1 is unalloyed Pebax™ 7033. The test specimen of Example 1 is an 80:20 blend of Pebax™ 7033 with the maleated ethylene copolymer, and the specimen of Example 2 is a 70:30 blend. The test specimen of Comparative Example 2 is unalloyed Pebax™ 5333. The test specimen of Example 3 is a blend of Pebax™ 5533, 36 wt. %, Pebax™ 6633, 56 wt %, the maleated ethylene copolymer, 8 wt. %, and the maleated ethylene-methyl acrylate copolymer, 6 wt %. The blends of Pebax™ and the maleated ethylene copolymer were prepared in a twin screw extruder. Test specimens (2.54 mm×15 mm×3.5 mm) were formed by injection molding at about 220° C. to 230° C.

2. Standard Test Methods

Hardness was measured according to ASTM D792. Tensile modulus, tensile strength and tensile elongation were measured according to ASTM D638. Tear strength was measured according to ASTM D642C. Ross flex value was measured according to ASTM D1052. The peel strength specimens of Pebax™ and the Pebax™ blends, after bonding to polybutadiene rubber, were tested using a universal material testing machine available from the Instron Corporation of Canton, Mass. The cross head speed was 50 mm/min. The results of these measurements are set forth in Tables 1 and 2, below.

a. Solvent-Based Primer

The test specimens were first cleaned with methyl ethyl ketone (MEK) at room temperature, then a solvent-based primer was applied (Dongsung NSC D-PLY 160-2), followed by drying at 60 to 65° C. in a convection oven. A solvent-based polyurethane primer (Dongsung NSC W-104) was applied to the test specimens, which were then dried at 50 to 55° C. in an oven. A water-based polyurethane adhesive (Dongsung NSC W-01) was then applied to the primed test specimens, which were subsequently dried at 55 to 60° C., followed by degreasing the surfaces with toluene and further drying at 50 to 55° C. A solvent-based primer (Dongsung NSC D-PLY 007) was then applied to the test specimens, followed by a water-based polyurethane adhesive (Dongsung NSC W-01). Then the specimens were molded with polybutadiene rubber at a pressure of 30 kg/cm for 210 seconds, prior to measuring the peel strength.

b. Water Based Primer

The test specimens were first cleaned with methyl ethyl ketone (MEK) at room temperature, then a water-based polyurethane primer (Dongsung NSC W-104) was applied to the test specimens, which were then dried at 50 to 55° C. in an oven. A water-based polyurethane adhesive (Dongsung NSC W-01) was then applied to the primed test specimens, which were subsequently dried at 55 to 60° C., followed by degreasing the surfaces with toluene and further drying at 50 to 55° C. A water-based polyurethane primer (Dongsung NSC W-104) was then applied to the test specimen, followed by a water-based polyurethane adhesive (Dongsung NSC W-01). Then the specimen were molded with polybutadiene rubber at pressure of 30 kg/cm for 210 seconds, prior to measuring the peel strength.

3. Results and Discussion

The compositions of Example 1 and Example 2 are well matched with Comparative Example 1 in each of the key properties listed in Table 1. For example, the test specimens of both Examples 1 and 2 displayed excellent Ross flex test results at room temperature and at −10° C.

Table 1 also includes the bonding strength of the test specimens of Comparative Example 1 and Examples 1 and 2 towards rubber, using both solvent-based and water-based adhesives. With the solvent-based adhesives, the bonding strength of the specimen of Example 1 toward rubber is in the range of 19.1 to 23.3 kg/cm, far better than that of the specimen of Comparative Example 1. With the water-based adhesives, the bonding strength of the specimen of Example 1 shows an improvement over that of the specimen of Comparative Example 1. The specimen of Example 2, with its greater content of maleated ethylene copolymer, shows significant improvement in its bonding strength towards rubber with water-based adhesives. The lower bonding strength of the specimen of Example 2 with the solvent-based adhesives is an unexpected result that may reflect a change in the nature of the surface of this specimen.

TABLE 1

Properties of Polymer Blends

| | Comparative Example 1 Pebax ™ 7033 | Example 1 Pebax ™ 7033/MEC* (80/20%) | Example 2 Pebax ™ 7033/MEC (70/30%) |
|---|---|---|---|
| Bonding (kg/cm) solvent-based primer | 10~14 (pass, but frequent fail) | 19.1~23.3 | 1.9~3.5 |
| Bonding (kg/cm) water-based primer | Fail | 2.1~4.2 (fail) | 4.1~7.0 (pass) |
| Hardness (Shore D) | 69 | 57 | 55 |
| Specific gravity (g/cc) | 1.02 | 1.012 | 1.007 |
| Modulus (kg/cm$^2$) | 320 | 306 | 292 |
| Tensile Strength(kg/cm$^2$) | 435 | 332.6 | 303.5 |
| Elongation (%) | 395 | 375 | 325 |
| Tear (kg/cm) | 20.1 | 18.8 | 17.3 |
| Flex Ross (cycle) at −10° C. | Pass 100,000 | Pass 100,000 | Pass 100,000 |
| Flex Ross (cycle) at RT | Pass 150,000 | Pass 150,000 | Pass 150,000 |

*In Table 1, "MEC" is an abbreviation of "maleated ethylene copolymer."

Table 2 includes the bonding strength of the test specimens of Comparative Example 2 and Example 3 towards rubber, using solvent-based primer. In order to obtain statistically significant results, 24 test specimens of each of Comparative Example 2 and Example 3 were produced for bonding strength measurements. As is set forth in Table 2, the composition of Example 3 shows an average bonding value of 10.5 kg/cm and a minimum bonding value of 6.4 kg/cm. The composition of Comparative Example 2 shows an average bonding value of 7.1 kg/cm and a minimum bonding value of 0.4 kg/cm. Out of 24 specimens, 7 specimens of Comparative Example 2 exhibited bonding strength less than 2.0 kg/cm, which is too low, indicating that this composition is vulnerable to failure in the contemplated applications.

TABLE 2

Bonding Strength of Polymer Blends

| | Bonding (kg/cm), solvent-based primer | | |
|---|---|---|---|
| | Average value | Maximum value | Minimum value |
| Comparative Example 2 | 7.1 | 14.1 | 0.4 |
| Example 3 | 10.5 | 14.9 | 6.4 |

While certain of the preferred embodiments of the present invention have been described and specifically exemplified above, it is not intended that the invention be limited to such embodiments. Various modifications may be made without departing from the scope and spirit of the present invention, as set forth in the following claims.

What is claimed is:

1. A polymer composition consisting essentially of:
about 60 to about 95 wt % of at least one thermoplastic elastomer that consists essentially of a copolyetheramide of the formula

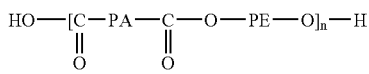

wherein "PA" represents a linear saturated aliphatic polyamide sequence formed from a lactam or amino acid having a hydrocarbon chain containing 4 to 14 carbon atoms, or from an aliphatic $C_6$ to $C_9$ diamine, in the presence of a chain-limiting aliphatic carboxylic diacid having 4 to 20 carbon atoms; wherein the polyamide has an average molecular weight between 300 and 15,000 Daltons;
wherein "PE" represents a polyoxyalkylene sequence formed from linear or branched aliphatic polyoxyalkylene glycols, mixtures thereof or copolyethers derived therefrom, said polyoxyalkylene glycols having a molecular weight of less than or equal to 6000 Daltons; and wherein the number of repeat units, "n", is sufficient so that the polyetheramide copolymer has an intrinsic viscosity measured in metacresol at 25° C. of from about 0.8 to about 2.05; and
about 5 to about 40 wt % of at least one maleated ethylene copolymer, based on the total weight of the polymer composition;
wherein said at least one maleated ethylene copolymer comprises a grafted copolymer that is the reaction product of a monomer and an ethylene copolymer, wherein said monomer is selected from the group consisting of maleic anhydride, maleic acid, esters of maleic anhydride and half-esters of maleic anhydride and wherein said ethylene copolymer is selected from the group consisting of a copolymer of ethylene, alkyl acrylate, and carbon monoxide; and a copolymer of ethylene, vinyl acetate, and carbon monoxide.

2. The polymer composition of claim 1, wherein the at least one thermoplastic elastomer is present in an amount of from about 70 to about 90 wt %; and further wherein the at least one maleated ethylene copolymer is present in an amount of from about 10 to about 30 wt %, based on the total weight of the polymer composition.

3. The polymer composition of claim 1, wherein the at least one thermoplastic elastomer is present in an amount of from about 75 to about 85 wt %; and further wherein the at least one maleated ethylene copolymer is present in an amount of from about 15 to about 25 wt %, based on the total weight of the polymer composition.

4. The polymer composition of claim 1, wherein the monomer in the grafted copolymer is selected from the group consisting of maleic anhydride and half-esters of maleic anhydride.

5. The polymer composition of claim 1, wherein the amount of monomer in the grafted copolymer is in the range of 0.3 to 3.0 wt %, based on the total weight of the grafted copolymer.

6. The polymer composition of claim 5, wherein the amount of monomer in the grafted copolymer is in the range of 0.5 to 1.5 wt %.

7. The polymer composition of claim 1, wherein the amount of vinyl acetate in the copolymer of ethylene, vinyl acetate, and carbon monoxide is greater than about 15 wt %, based on the total weight of the copolymer.

8. The polymer composition of claim 1, wherein the amount of alkyl acrylate in the copolymer of ethylene, alkyl acrylate, and carbon monoxide is greater than about 15 wt %, based on the total weight of the copolymer.

9. The polymer composition of claim 1, wherein the amount of carbon monoxide in the copolymer of ethylene, alkyl acrylate, and carbon monoxide is in the range of about 5 to about 15 wt %, based on the total weight of the copolymer.

10. The polymer composition of claim 1, further comprising a second maleated ethylene copolymer that is a second grafted copolymer, wherein said second grafted copolymer is the reaction product of a second monomer and a second ethylene copolymer;
wherein said second monomer is selected from the group consisting of maleic anhydride, maleic acid, esters of maleic anhydride and half-esters of maleic anhydride; and
wherein said second ethylene copolymer is selected from the group consisting of a copolymer of ethylene and vinyl acetate and a copolymer of ethylene and an alkyl acrylate.

11. The polymer composition of claim 1, further comprising a direct copolymer that is the reaction product of ethylene and an alpha, beta unsaturated dicarboxylic acid monomer.

12. The polymer composition of claim 11, wherein the alpha, beta unsaturated dicarboxylic acid is selected from the group consisting of fumaric acid, maleic acid, maleic anhydride, and the esters and half-esters of maleic anhydride.

13. The polymer composition of claim 12, wherein the alpha, beta unsaturated dicarboxylic acid comprises maleic acid or a maleic acid ester, or a half-ester of maleic acid.

14. The polymer composition of claim 11, wherein the direct copolymer is a terpolymer of ethylene, vinyl acetate or an acrylic ester and an alpha, beta unsaturated dicarboxylic acid.

15. The polymer composition of claim 14, wherein the acrylic ester comprises one or more compounds selected from the group consisting of methyl acrylate, ethyl acrylate, n-butyl acrylate and iso-butyl acrylate.

16. The polymer composition of claim 14, wherein the terpolymer comprises from about 60 wt % to about 85 wt % of ethylene, from about 15 wt % to about 39 wt % of the acrylic ester, and from about 1 wt % to about 8 wt % of the alpha, beta unsaturated dicarboxylic acid, based on the total weight of the terpolymer.

17. The polymer composition of claim 14, wherein the terpolymer comprises from about 70 wt % to about 85 wt % of ethylene, from about 15 wt % to about 29 wt % of the acrylic ester, and from about 1 wt % to about 3 wt % of the alpha, beta unsaturated dicarboxylic acid, based on the total weight of the terpolymer.

18. The polymer composition of claim 14, wherein the terpolymer comprises a copolymer of ethylene, methyl acrylate, and maleic anhydride.

19. An article comprising the polymer composition of claim 1.

20. The article of claim 19, being a sole plate or a shank of a shoe.

21. The article of claim 19, wherein the article is attached to a second article by means of a water-based adhesive, a solvent based adhesive, or a hot-melt adhesive.

22. The article of claim 21, wherein the adhesive is a water-based adhesive.

23. The article of claim 21, wherein the adhesive comprises a polyurethane.

24. The article of claim 22, wherein the adhesive comprises a polyurethane.

25. The article of claim 21, wherein the second article comprises a rubber.

26. The article of claim 22, wherein the second article comprises a rubber.

27. The article of claim 21, being a shoe, an athletic shoe, an in-line skate, a ski boot, or a binding for a ski boot.

28. The article of claim 22, being a shoe, an athletic shoe, an in-line skate, a ski boot, or a binding for a ski boot.

29. The polymer composition of claim 11, wherein the direct copolymer is also a grafted copolymer.

* * * * *